Patented Jan. 27, 1942

2,271,093

UNITED STATES PATENT OFFICE

2,271,093

HIGH MOLECULAR WEIGHT SUBSTANCE

Mathias Pier, Heidelberg, and Friedrich Christmann, Ludwigshafen-on-the-Rhine, Germany, assignors, by mesne assignments, to William E. Currie, New York, N. Y.

No Drawing. Application July 6, 1938, Serial No. 217,814. In Germany July 21, 1937

10 Claims. (Cl. 196—78)

The present invention relates to new high molecular weight substances and a process for producing the same, as well as to compositions containing such substances, more particularly hydrocarbon oil compositions.

We have found that valuable high molecular weight substances are obtained by reacting halogen derivatives of hydrocarbons with unsaturated compounds which contain at least 4 carbon atoms and which as such are capable with the aid of acid reacting inorganic halides or large-surfaced substances of being polymerized to products which have a molecular weight of at least 600, preferably of from 800 to 1000 or more.

The reaction may be effected for example by means of electric discharges, in particular silent electric discharges of high voltage and high frequency, but it is preferable to use inorganic, acid-reacting halides or substances having a large superficial area as catalysts. Such catalysts are for example aluminum chloride, iron chloride, zinc chloride, titanium chloride and in particular boron fluoride, and also its addition compounds with alcohols, ethers, acids or water. As suitable substances having a large superficial area there may be mentioned in particular those of acid nature, such as kieselguhr or the known bleaching earths, for example those which are in commerce under the names "Terrana," "Florida earth" and "fuller's earth." The effect of these substances can often be enhanced by the addition of acids, such as for example boric acid or phosphoric acid, or of acid salts. When using inorganic halides as catalysts it is preferable in many cases to carry out the reaction in the presence of compounds which retard the reaction, as for example zinc oxide, sodium carbonate, calcium carbonate or ammonia.

As halogen derivatives of hydrocarbons suitable as initial materials for the reaction there may be mentioned for example the halogen derivatives of the lower aliphatic hydrocarbons, such as for example methyl chloride, carbon tetrachloride and ethylene chloride. There may also be mentioned halogen derivatives of aromatic hydrocarbons, as for example chlorbenzene. Especially suitable halogen derivatives are obtained by the halogenation in known manner of hydrocarbons which are rich in hydrogen and mainly aliphatic, as for example those containing more than 13.5 grams, preferably more than 15 grams, of hydrogen for each 100 grams of carbon. Such hydrocarbons may be obtained for example from paraffin base mineral oils or their fractions, also from destructive hydrogenation products of coals, tars and mineral oils or their fractions. Hard or soft paraffin waxes or petroleum residues containing paraffin wax, crude petroleum jelly (petrolatum), ceresine or ozokerite or mixtures containing the same are, for example especially suitable hydrocarbons. The halogenation products of the hydrocarbon mixtures obtainable in the benzine synthesis from carbon monoxide and hydrogen under atmospheric or increased pressure are also suitable.

As suitable unsaturated compounds containing at least four carbon atoms there may be mentioned for example styrene and its homologues, vinyl ethers, as for example vinyl ethyl ether, vinyl isobutyl ether, or vinyl oleyl ether, vinyl esters, unsaturated alcohols, vinylcarbazol, monovinylacetylene, divinylacetylene, cumarone and indene. Mixtures of such substances may also be used for the reaction.

The reaction may be carried out at ordinary or elevated or even at reduced temperature. For example the reaction may be effected at temperatures between 10° below zero and 70° below zero centigrade or still lower. Generally speaking the use of elevated temperature is advantageous, but the temperature should not be allowed to rise so high that a splitting of the high molecular weight substances formed takes place. Temperatures of 200°, preferably those of 100° centigrade are therefore not exceeded as a rule. In the reaction, solvents may also be used, as for example hydrocarbons, such as for example benzene or benzine, or halogenated hydrocarbons, such as for example carbon tetrachloride, chloroform or ethylene chloride, or mixtures of two or more of such solvents. Depending on the reaction conditions, the said solvents may take part in the reaction, but they are used in such large amounts as a rule that a great part thereof can be separated unchanged after the reaction.

The high molecular weight substances obtained are soluble in hydrocarbon oils and are distinguished in that they increase the viscosity of oils and are capable of lowering the setting point of lubricating oils even when added in small amounts, as for example from 0.1 to 3 per cent. They are eminently suitable as additional substances to gear oils and gear greases.

The following example will further illustrate how this invention may be carried out in practice but the invention is not restricted to this example. The parts are by weight.

*Example*

100 parts of a chlorination product containing about 12 per cent of chlorine obtained by chlorinating hard paraffin wax at 80° are diluted with 100 parts of ethylene chloride and heated with 14 parts of styrene for 24 hours in the presence of 6 parts of aluminum chloride and 5 parts of zinc oxide. The temperature of the mass is first kept at 30° C. or slightly higher and is not increased to 90° C. until towards the end of the reaction. The reaction mass is freed from undissolved substances contained therein by centrifuging, freed from unchanged diluent by distillation and then distilled in vacuo with steam. There are thus obtained, in addition to 30 parts of unchanged paraffin wax and light lubricating oil, 60 parts of a highly viscous oil having a viscosity of 46° Engler at 100° C. as a distillation residue.

By adding 1 per cent of this oil to a machine oil obtained from German mineral oil, the setting point of the latter is lowered from 3° below zero to 18° below zero C.

What we claim is:

1. The process of producing a high molecular weight substance which comprises reacting a halogen derivative of a hydrocarbon selected from the class consisting of aromatic hydrocarbons and saturated aliphatic hydrocarbons with an unsaturated aromatic compound which contains an olefinic linkage and which is capable with the aid of an acid-reacting inorganic halide of being polymerized to a product having a molecular weight of at least 600.

2. The process as claimed in claim 1, in which the reaction is effected by means of silent electric discharges.

3. The process as claimed in claim 1, in which the reaction is effected by means of a silicate having a large superficial area.

4. The process as claimed in claim 1, in which the reaction is effected by means of an acid-reacting inorganic halide.

5. The process as claimed in claim 1, in which the halogen derivative of a hydrocarbon is derived from a high molecular weight aliphatic hydrocarbon.

6. The process as claimed in claim 1, in which the halogen derivative of a hydrocarbon is derived from paraffin wax.

7. The process as claimed in claim 1, in which the halogen derivative of a hydrocarbon is derived from paraffin wax and the reaction is effected by means of an acid-reacting inorganic halide.

8. The process as claimed in claim 1, in which the unsaturated compound is styrene.

9. The process as claimed in claim 1, in which the unsaturated compound is styrene, the halogen derivative of a hydrocarbon is derived from paraffin wax and the reaction is effected by means of an acid-reacting inorganic halide.

10. A composition of matter comprising a reaction product of a halogen derivative of a hydrocarbon selected from the class consisting of aromatic hydrocarbons and saturated aliphatic hydrocarbons with an unsaturated aromatic compound which contains an olefinic linkage and is capable with the aid of an acid-reacting inorganic halide of being polymerized to a product having a molecular weight of at least 600.

MATHIAS PIER.
FRIEDRICH CHRISTMANN.